Figure 2:
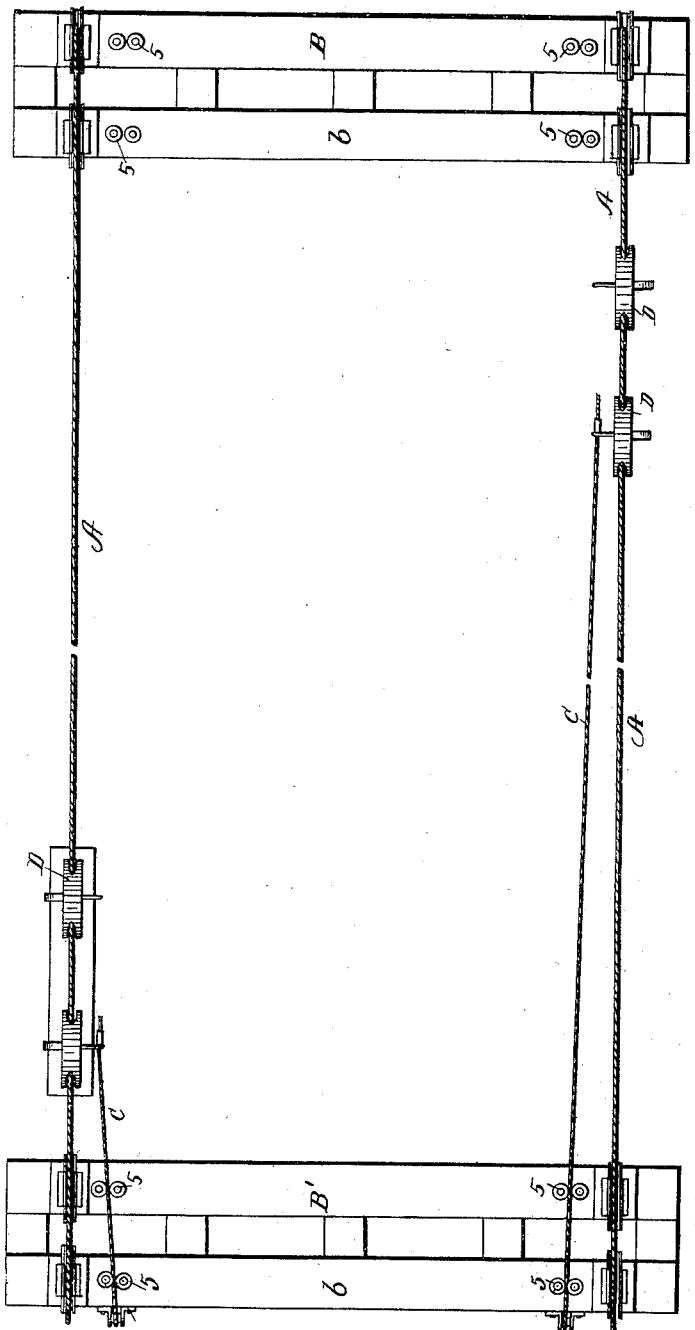

No. 703,222. Patented June 24, 1902.
T. ALEXANDER.
ELEVATED CABLE SYSTEM OF TRANSPORTATION.
(Application filed Oct. 7, 1901.)
(No Model.) 6 Sheets—Sheet 1.
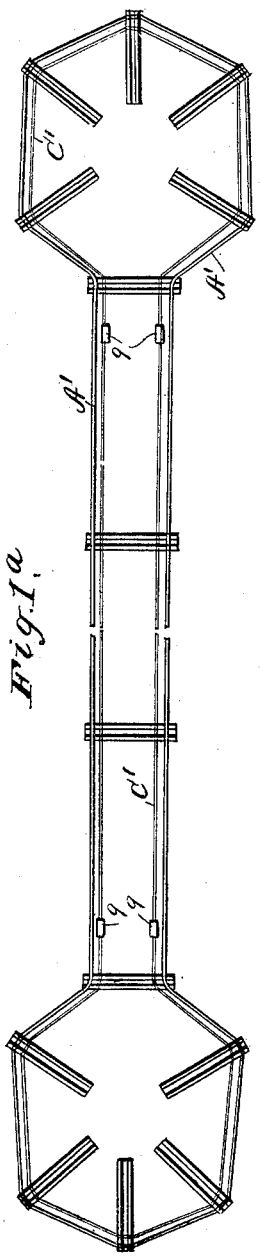
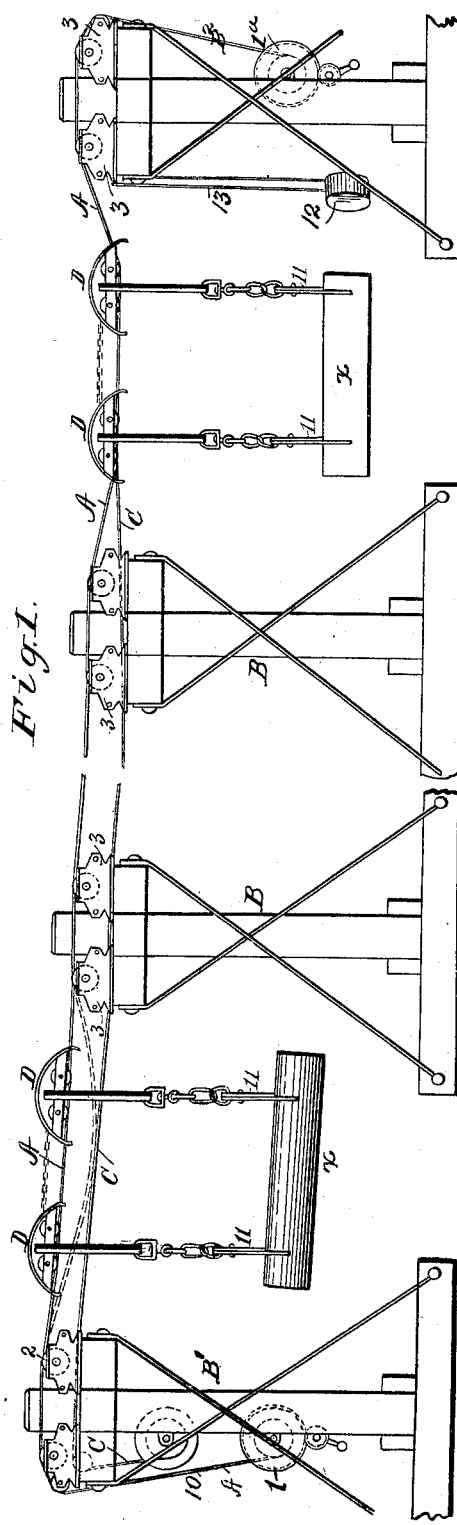
Fig.1a.
Fig.1.
WITNESSES:
W. R. Edelen.
Amos W. Hart.
INVENTOR
Tony Alexander
BY
ATTORNEYS No. 703,222. Patented June 24, 1902.
T. ALEXANDER.
ELEVATED CABLE SYSTEM OF TRANSPORTATION.
(Application filed Oct. 7, 1901.)
(No Model.) 6 Sheets—Sheet 2.

WITNESSES:
W R. Edelen.
Amos W Hart

INVENTOR
Tony Alexander.
BY Munn Co.
ATTORNEYS

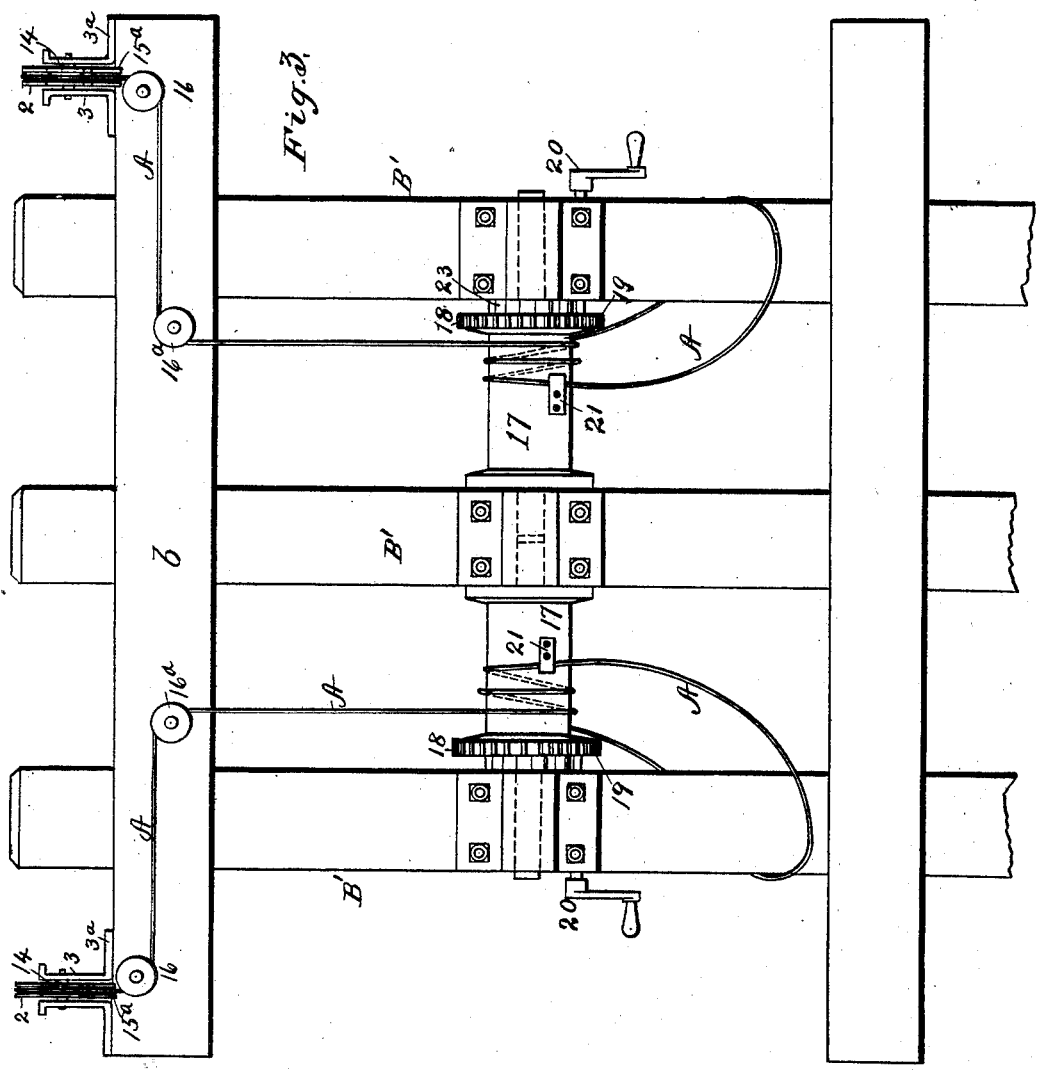

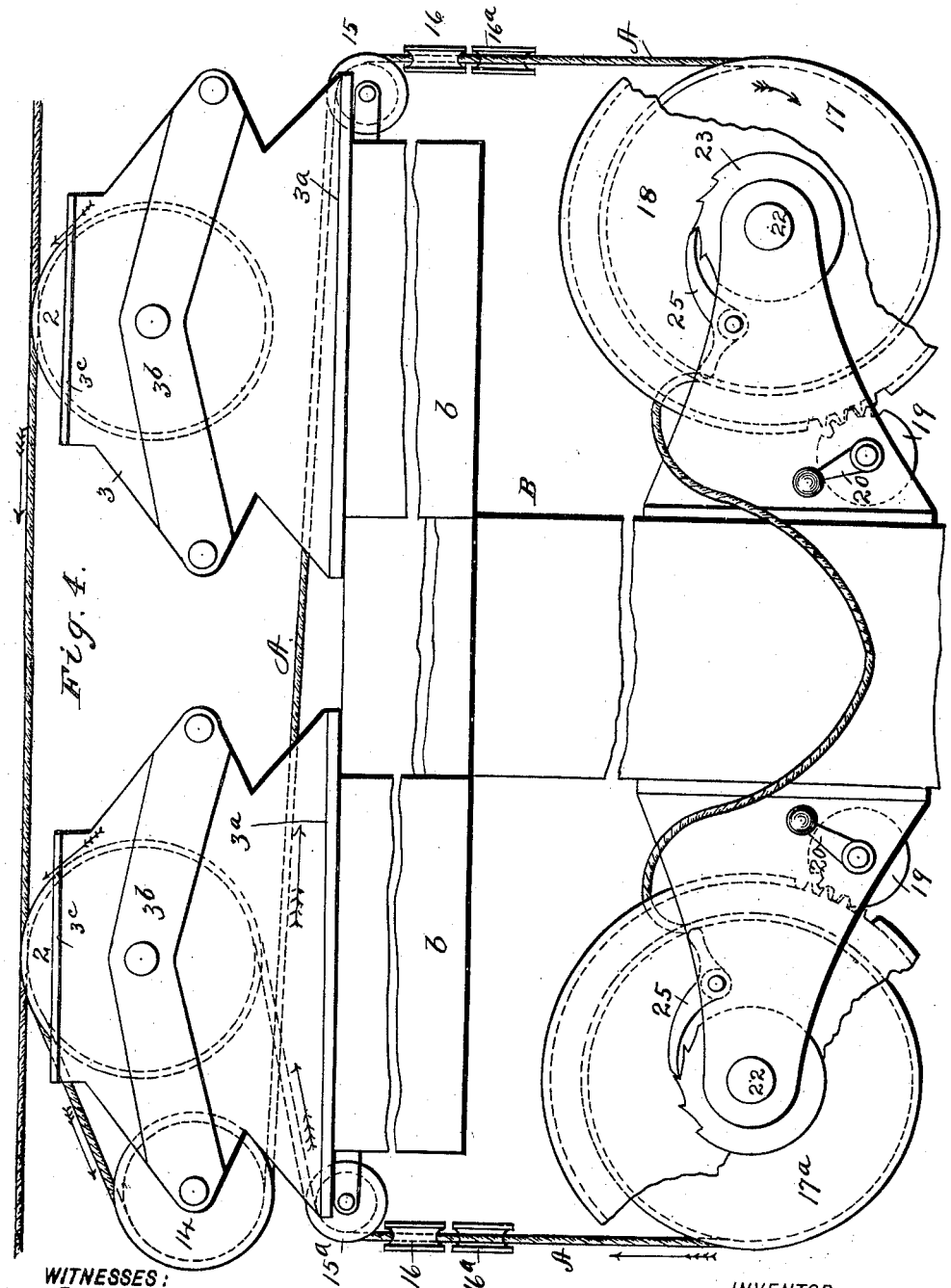

No. 703,222. Patented June 24, 1902.
T. ALEXANDER.
ELEVATED CABLE SYSTEM OF TRANSPORTATION.
(Application filed Oct. 7, 1901.)
(No Model.) 6 Sheets—Sheet 5.
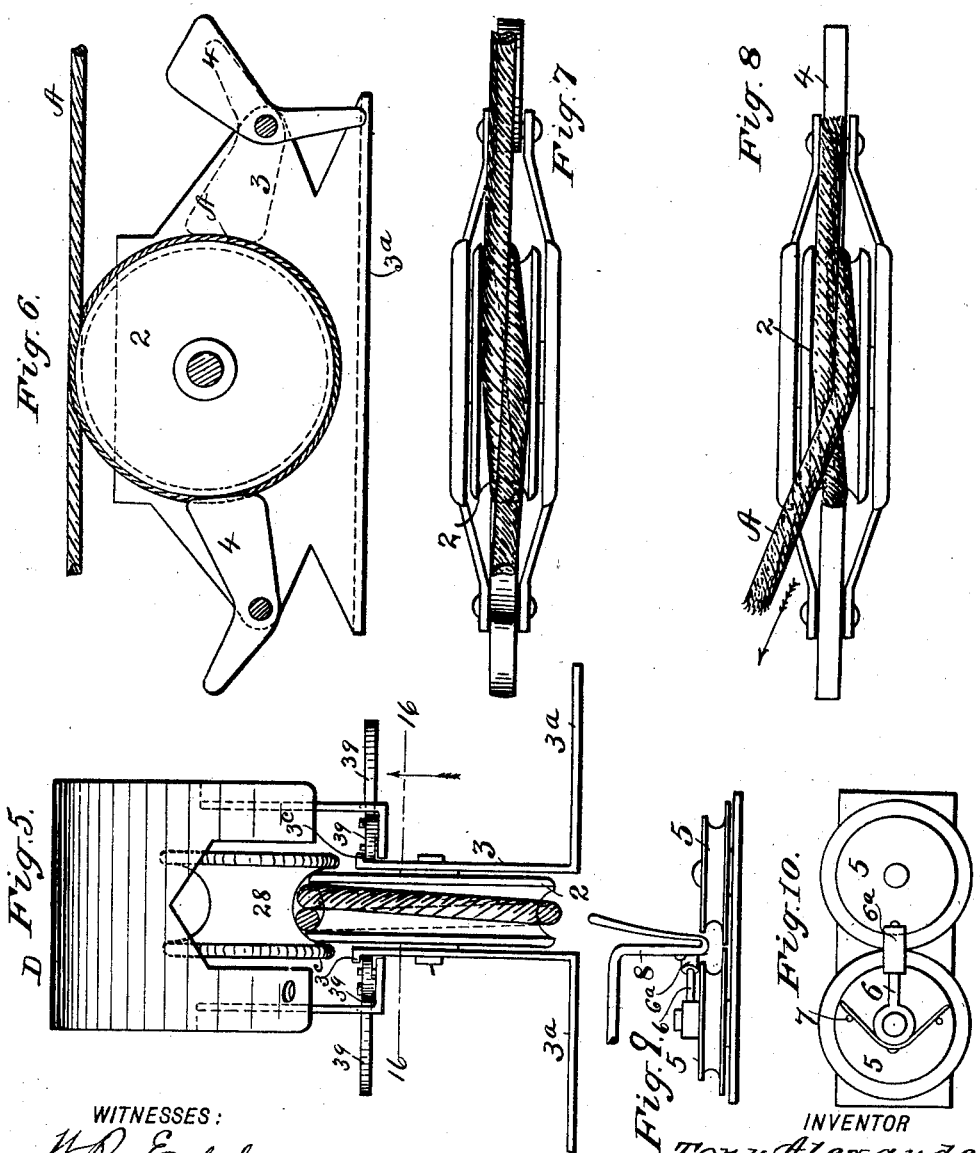
WITNESSES:
W. R. Edelen
Amos W. Hart
INVENTOR
Tony Alexander.
BY Munn & Co.
ATTORNEYS

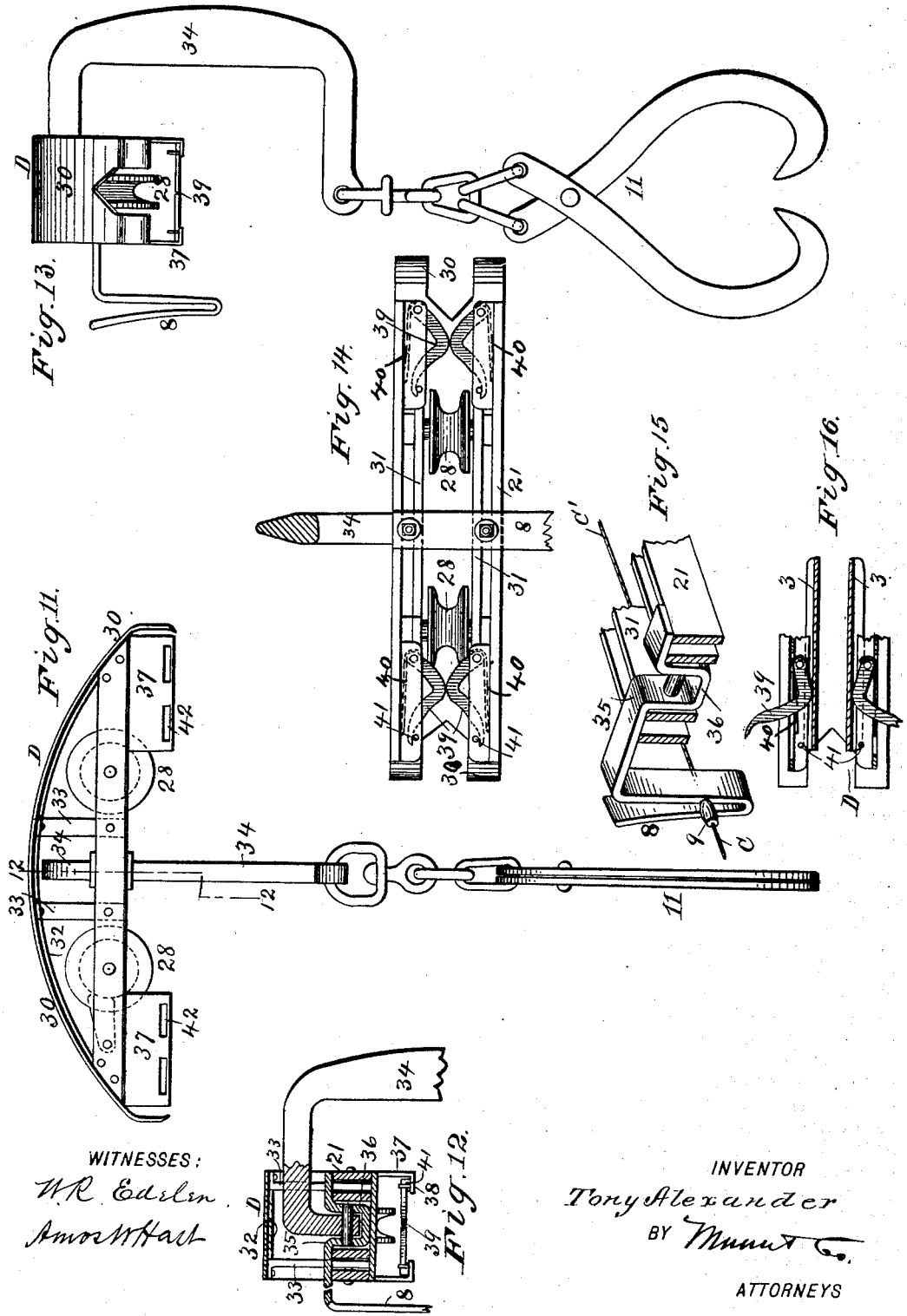

UNITED STATES PATENT OFFICE.

TONY ALEXANDER, OF BISMARCK, MISSISSIPPI, ASSIGNOR OF ONE-HALF TO GIDEON ALEXANDER, OF NEW ORLEANS, LOUISIANA.

ELEVATED-CABLE SYSTEM OF TRANSPORTATION.

SPECIFICATION forming part of Letters Patent No. 703,222, dated June 24, 1902.

Application filed October 7, 1901. Serial No. 77,782. (No model.)

*To all whom it may concern:*

Be it known that I, TONY ALEXANDER, a citizen of the United States, residing at Bismarck, in the county of Lawrence and State of Mississippi, have made certain new and useful Improvements in Elevated-Cable Systems of Transportation, of which the following is a specification.

My invention is an improvement in that system of overhead carriers for transporting logs, dirt, coal, and other freight in which a truck or carriage runs upon a cable attached to horizontal arms or brackets affixed to posts.

My invention includes improved means for supporting and locking the cable, whereby it is held rigidly and duly taut; also, to means for raising the cable to cause propulsion of the log or other freight by gravity and for allowing slack of the cable at any desired point in the line for the purpose of taking up or arresting and releasing the logs, &c., when at the end of their transit. In brief, the arrangement is such that a slack may be produced at any point for the purpose of hoisting and taking up logs or lowering and releasing them, as may be required, and this may be done on a single line of cable or a continuous and circuitous one.

The invention, further, includes an arrangement of the cable and its special supports whereby the carriage from which the log is suspended in transit may be turned or switched to the right or left, so as to pass around an angle or curve, as occasion requires.

The invention, further, includes an improved connection between the hauling-line and the carriage, the same being engaged and disengaged manually on a single line or automatically on a continuous line as the carriage is raised and lowered for hoisting and releasing logs, &c. The carriage is so constructed that it may traverse the cable and pass its pulley-supports at a high rate of speed with perfect safety.

The invention includes various other features and details of construction, arrangement, and combination of parts, as hereinafter described.

In accompanying drawings, Figure 1 is a side view illustrating my invention in relation to a single-cable system. Fig. 1ª is a diagrammatic plan view illustrating the arrangement of the cable when continuous as distinguished from a single line illustrated in Fig. 1. Fig. 2 is a plan view of two single-cable systems, such as illustrated in Fig. 1. Fig. 3 is a view illustrating the construction and arrangement of parts for producing a slack in the cable at any point intermediate of the ends of the line. Fig. 4 is a side view further illustrating the arrangement of parts for forming a slack or loop in the cable intermediate of the ends of the line. Fig. 5 is an end view of a carriage or truck for transporting logs or other freight, together with a sheave or pulley support for the cable. Fig. 6 is a side view of one of the sheaves or pulleys upon which the cable is supported and around which it is wound. Fig. 7 is a plan view of the parts shown in Fig. 6. Fig. 8 is a plan view of the same parts as shown in Figs. 6 and 7, but illustrating a turn or switch of the cable for deflecting the truck or carriage laterally. Fig. 9 is an edge view illustrating the means for hauling the cable down at certain points and also showing the operation whereby the carriage passes. Fig. 10 is a plan view of the parts shown in Fig. 9 for hauling down the cable. Fig. 11 is a side view of a truck or carriage with the grapple attached. Fig. 12 is a vertical cross-section on the line 12 12 of Fig. 11. Fig. 13 is an end view of the carriage with the grapple attachment. Fig. 14 is a bottom plan view of the carriage, save that the grapple-arm is in section. Fig. 15 is a detail sectional view of a portion of the carriage, illustrating the engagement of its lateral arm with the cable. Fig. 16 is a bottom plan view of a portion of the carriage and a horizontal section of a portion of one of the cable-pulley supports, illustrating the operation of the carriage passing the said support.

Referring in the first instance especially to Figs. 1 and 2, A indicates the cable, which is supported upon posts B, B', and B². The end posts of the line are indicated by B' and B². The several posts or frames will in practice be constructed as described in an application, Case A, filed by me of even date herewith, and it is unnecessary in this instance to describe their special construction. It is to be understood that while I prefer to employ them my cable system of transportation is not restricted to any form of post. The cable is wound around a windlass 1 or 1ᵃ at each end of the line A, which windlasses may be constructed in any approved manner and are operated by power or manually, as the case may be. The cable passes over and around a series of pulleys or sheaves 2, which are arranged in pairs on the horizontal arms *b* of the several posts B, B', and B². The special construction of these sheave-supports 2 is illustrated in Figs. 5, 6, and 7. The sheave proper, 2, is journaled vertically in a casing 3, composed of two plates of plate iron or steel arranged vertically parallel and having base-flanges 3ᵃ, (see Fig. 5,) by which they may be bolted in place upon the arms *b* of the several posts. As shown, the cable A passes once around the sheave or pulley 2. When the line or cable A has been stretched to the required degree and is taut, the cable A and sheaves 2 are locked by means of gravity-dogs 4, of which two are provided, the same being journaled in the casing 3 on opposite sides of and in the same vertical plane with the sheave 2. Thus when the broad ends of the dogs 4 are turned inward, as illustrated in Fig. 6, they engage the cable and prevent movement of the same and the sheave in either direction. In other words, it is apparent that one dog locks in one direction and the other in the opposite direction, so that it is manifest that whichever way the cable A may be drawn the sheave 2 will rotate accordingly and one dog 4 will lock, while the other rides free on the cable-bight wound around the sheave. This is a feature of great practical importance, since it enables a cable to be stretched or taken up at any time at either end of the line, and locking of the cable and sheaves is automatically performed. In Fig. 2 I show two guard or guide pulleys 5 for the hauling-rope C, arranged and secured upon the horizontal arms *b* of an end post B'. The arrangement of these parts 5 is further shown in Figs. 9 and 10. Two peripheral-grooved pulleys are juxtaposed in the same horizontal plane. In practice the cable A passes between these pulleys 5, and the guard-arm 6 projects over or spans the space between them, as shown in Fig. 10. This guard-arm is pivoted upon the journal of one of the sheaves 5, and a plate-spring is attached to the same, its ends engaging pins 7. Thus the spring tends to hold the arm 6 normally directed across the space between the sheaves 5. A roller 6ᵃ is applied to the arm 6 for the purpose of relieving friction due to engagement with the lateral traction-arm 8 of the carriage D. (See Fig. 13.) The hauling-rope C is shown in Fig. 2 connected with such lateral arm 8, which has a V-shaped vertical loop, as shown in Fig. 13, into which the said rope C is received. The end of the rope is provided with a button or stop 9, consisting of a piece of wood or metal, which is firmly secured to the rope and made of such size that it will not pass through the loop 8, but by abutting the same serves as a stop. The outer end of the rope C is attached to a windlass 10 (see Fig. 1) and is paid off or taken up thereby as required to allow the carriage D to travel from the end post B' or toward the same. It will be understood that when the carriage D travels from the said post B' it is for the purpose of transporting logs or other freight to the other end of the cable or to some intermediate point and that the carriage is retracted or drawn back toward the post B' by means of rope C and windlass 10. I propose to employ any motor or means for causing the carriage D to travel either way on the cable A; but in this instance—that is to say, in Figs. 1 and 2—I illustrate such arrangement of parts that the carriage operates or travels by gravity in one direction. To cause the carriage D to run out by gravity, the cable A is necessarily inclined. In other words, it is normally at a slight downward inclination from the post B' to a point near the other terminal post B², as shown in Fig. 1. Hence whenever the cable is drawn taut between the post B' and the adjacent post B the carriage will travel by gravity to the end of the line, or rather to a point intermediate the end post B² and the adjacent post B, for the post B² is the higher, so that the cable A rises at that point. In Fig. 1 the cable A is shown slack in dotted lines between the posts B' and B, whereby it is manifest the carriage or carriages will be lowered, as may be required, to enable the grapples 11 to be engaged with a log X. It will be understood that this slack is effected by allowing the cable A to pay off from the windlass 1 and that the cable is securely locked by dogs 4 to all the sheaves 2 on the intermediate posts B, so that it is held duly taut, save between posts B' and B. It will be further understood that any required degree of slack may be produced, so that the carriages D may be lowered to any required extent. For the purpose of carrying logs I employ two duplicate carriages D, which are coupled by a chain or other suitable device. When the log has been duly engaged by the grapples 11, the windlass 1 is operated to take up the slack or draw the cable A taut, as shown by full lines, Fig. 1, and the carriages being thus raised and at the same time released from a detaining-rope (not shown) will travel rapidly along the cable A until they reach the point where the log is to be lowered and released. This point may be anywhere along the line; but as shown in Fig. 1 it is adjacent to or in front of the end post B². It will be understood that for the purpose of arresting the log and lowering it at that point the cable A is slackened in the same manner as before described, which is effected by paying off the cable from the windlass 1ᵃ, attached to the post B². When the log X has been released from the grapples 11, the windlass 1ᵃ is again rotated to draw the cable taut between the posts B² and B, and thus raise the carriage when the windlass 10 is operated to wind up the hauling-rope C, whereby the carriages are drawn back to the starting-point for repetition of the operation—that is to say, for engagement of the grapples 11 with another log which requires to be transported like the first. It will be seen in Fig. 1 that the rise of cable A between the end post B² and B arrests or tends to arrest the carriages D, even if the cable A be not slackened at that point, as above described. This depends, however, in part upon the rapidity with which the log travels and the degree of general inclination of the cable from post B' to the point where the log is to be discharged. For the purpose of insuring safety I employ a swinging buffer 12 for the log X, which buffer 12 is suspended by ropes 13 from the cross-piece b to post B².

For the purpose of slacking the cable A between the posts B, and thereby lowering the carriages and log for the purpose of releasing the latter at any point intermediate of the terminals B' and B², I employ the mechanism shown in Figs. 3 and 4. As shown in Fig. 4, two cable-supporting pulleys or sheaves 2 are secured upon the arms or platform of a post B, and one of them—to wit, the left-hand one— is provided with a small pulley 14, which is arranged in line with it and journaled in the same casing 3ª. The latter has a lengthwise brace or reinforce 3ᵇ. The cable passes around the right-hand pulley 2, thence over the left-hand pulley 2, then around pulley 14, and back beneath both the pulleys 2 and over small antifriction-pulleys 15 and 16, thence down to a windlass 17, which is provided with a gear 18, operated by a pinion 19, having a shaft provided with a hand-crank 20. The cable A is wound one or more times around the windlass 17 and secured thereon by means of a clamp 21. It passes thence (see Fig. 4) to another windlass 17ª, over antifriction guide-pulleys 16ª and end pulley 15ª, and then around the adjacent sheave or pulley 2. The course of the cable is indicated by arrows for the sake of greater clearness of illustration. The windlasses 17 and 17ª are fixed on their shafts 22, to which a ratchet 23 is also applied. The large gear 18 is mounted loose on the shaft 22 and provided with a pivoted pawl 25, which engages the aforesaid ratchet 23. It is apparent that by rotating the pinion 19 in direction of the arrow, Fig. 4, the gear 18, through engagement of its pawl 25 with the ratchet 23, will rotate the adjacent windlass, so as to take up the cable A, and that by releasing the dog 25 the windlass will be released, so as to pay off the cable as may be desired. By employing the gear 18 I am able to utilize a considerable leverage for taking up the cable A, so as to give it the required degree of tension. It will be understood that this mechanism is for the purpose of producing a slack on either side of an intermediate post B, to which it is applied—that is to say, on the right-hand side or on the left-hand side of the cable-supports 2, secured on each post, as the case may require. Thus a stack may be produced at any point on the line A. It will be further apparent that when slack is produced the carriages carrying the log may be arrested and lowered and the log released or that the carriages may be arrested and lowered for the purpose of taking up logs that are to be transported farther along the line. It will be further seen that the same mechanism may be utilized to tighten the cable A wherever the former may be located. The employment of the pulley 14 is necessary in order to prevent undue friction or binding of the cable A. It will be understood that the loop or slack of cable A (shown in Fig. 3) is necessary to enable the cable to be paid out as required to allow the carriage to be lowered, as described.

I have thus far described a single line or cable system of transportation; but it is to be understood that my invention is equally applicable to an endless or continuous line A', which is diagrammatically represented in Fig. 1ª. In the system shown in Figs. 1 and 2 but a single carriage or series of connected carriages can be employed, and these must be hauled back to the starting-point after each release or delivery of the log or other freight; but when the continuous and stationary cable A' is employed the carriages will travel a continuous circuit, as indicated by arrows in Fig. 1ª. In the continuous or circuitous system carriages will be propelled by an endless hauling-line C', (see Fig. 1ª,) which will be arranged alongside the cable A' and be caused to travel by a rotary motor. The cable A' will be supported on pulleys or sheaves, as before described, and the hauling-rope C' will travel in guide-pulleys, such as shown in Figs. 9 and 10. It will be understood that the same means and method for slackening the cable A' and lowering the carriages for the purpose of releasing or taking up logs will be employed in the circuitous system as in the single-line system. It is obvious that in the circuitous system it is necessary to pass around or over certain angles or curves in the cable, and it may also be required in the single system. I have discovered by experiment an arrangement of the cable which enables this to be done with perfect security. It will be observed in Figs. 6 and 7 that the cable is always so wound around the sheaves 2 as to form a practically continuous line over the top of the same. When, however, it is desired to deflect the cable to the right or left, it is always crossed, as shown in Fig. 8, and when so arranged the wheels of the carriage D pass readily from the straight section to the laterally-inclined section of the cable. The space between the wheels 28 of the carriage D (see Fig. 11) is always such that when one wheel is on the inclined section of the cable the other wheel will be on the section forming an obtuse angle with it. In other words, the two wheels pass the angle at different times, and therefore the transit is made with entire safety, and, as experience proves, may be effected with rapidity. It will be understood that, as shown in Fig. 8, the switch or curve is to the right when the carriage is traveling in the direction of the arrow and that if the carriage were to be switched or deflected to the left the inclined section of the cable would be passed across from the opposite side. In other words, the laterally-inclined section of the cable always crosses over the straight one. By this simple arrangement of cable and support therefor I provide for passing curves and angles or for switching, as required in practice, without employing or requiring any supplemental device and that it permits the cable to be slackened or stretched, as before described. I desire to be understood that I do not restrict myself in this regard to a rotatable medium or element, such as the sheave 2, but may apply this arrangement of cable to a fixed support.

I will now describe the carriage with such detail as may be necessary. The frame of the same consists (see Figs. 11, 13, and 14) of an arch top bar 30 and lengthwise bars 31. The bars 31 are spaced apart and secured at their ends to the arch-bar 30. The wheels 28 are journaled between the bars 31 and as near their ends as practicable. The arch-bar 30 is supported by a brace 32, which has the same curve and is applied underneath the same lengthwise. Ties and struts 33 are applied near the center of the arch and extend down and are bolted to the bars 31. By this means I produce a strongly-trussed frame, the intention being to combine maximum strength and lightness. The ends of the arch-plate 30 are notched to receive the cable, but extended down so as to form buffers in case of contact of the carriages with each other or any other object. As shown in Figs. 11 and 13, a grapple 11 is suspended from a C-shaped hanger 34, whose upper end is curved downward and is secured to the carriage, as shown in Fig. 12, a pin 35 passing through it and through the adjacent sides of a saddle 36. The latter is practically U-shaped and supported upon and bolted to the central portions of the side bars 31. In practice I prefer to make this saddle in one piece with the arm 8, to which the hauling-rope C or C' is attached. It will be understood that by the arrangement described the weight suspended by the grapples 11 is applied to the carriage centrally and vertically, so as to be borne equally by its two grooved wheels 28. From the ends of the longitudinal frame-bars 31 depend two opposite plates 37, having inwardly-projecting flanges 38. Upon these flanges are pivoted two obtuse-angled bars 39, which are acted upon by springs 40, that hold them with the apexes of their angles in contact or in close contiguity, as shown in Figs. 12, 13, and 14. Stops 41 (see Figs. 12 and 14) are provided for engagement of the free ends of these bars. The function of the latter is to prevent the carriage becoming disengaged from the sheaves 2 and their casings 3 when causing them to lock the carriage to the cable. It will be apparent that the locking-bars are separated or parted when the carriage passes over one of the sheave-supports 2 3 of the cable. In other words, at such time the bars 39 are thrown laterally outward, as shown in Fig. 16, by contact with the casing 3 of a sheave or pulley, and are held thus pressed outward until the casing has been passed by the carriage. The casing 3 is provided at the top with horizontal flanges $3^c$, (see Fig. 4,) and the angles of bars 39 ride beneath them in passing. As shown in Fig. 11, slots 42 are formed in the flanged plates 37, through which the free ends of the locking-bars 30 may project when thrown outward.

I have before described the connection of the hauling-rope C with the arm 8 of the carriage D by reason of engagement of the button or stop 9 with the same; but when the endless or circuitous cable system, Fig. $1^a$, is employed the hauling-rope C' (see Fig. 15) will pass through the V-shaped arm 8 instead of stopping at that point, as in the single-line system. It is apparent that if in such case the carriage be lowered by slacking the cable, as before described, the arm 8 will be drawn downward or off from the hauling-rope C', and thereby released from engagement with the stop 9, and, contrariwise, the engagement will be resumed when the carriage is again hoisted to its normal position. In other words, the engagement and disengagement of the carriage-arm 8 with the continuous hauling-line C' is effected automatically as the carriage is raised and lowered. The line C' will run between the guide-pulleys 5.

It will be understood that the length of the line operated upon my system may be several miles and that the distance between the posts will be such as conditions may require. It will be further understood than any form of freight may be handled and transported by this system. In the case of a very long single line, where gravity cannot be depended upon throughout the same, the line may be divided into sections, and the carriages, with log or other freight attached, may be elevated from one section to the next by means of a hauling-line or any other special appliance. The entire system may be cheaply constructed and operates efficiently, safely, and rapidly.

Having thus described my invention, what I claim as new, and desire to secure by Letters Patent, is—

1. In an overhead-cable system of transportation, the combination of a cable and a series of supports therefor around which the cable is wound, the cable crossing and diverging from the upper side of said supports, substantially as shown and described.

2. In an overhead-cable system of transportation, the combination of a cable, means for stretching it, and a series of pivoted supports therefor around which the cable is wound, and upon the top of which the cable is crossed, as shown and described.

3. In an overhead-cable system of transportation, the combination of a cable, and a series of grooved sheaves supporting the same and journaled in suitable supports, the cable being wound around the sheaves and crossing and diverging in opposite directions upon the upper side of the sheaves, substantially as shown and described.

4. In an overhead-cable system of transportation, the combination of a cable, means for stretching it, a series of sheaves journaled as described and supporting the cable and around which the latter is wound, and means for locking the cable and sheaves, substantially as shown and described.

5. In an overhead-cable system of transportation, the combination of a cable, means for stretching it, and sheaves journaled as described, and supporting said cable, which is wound around them, and pivoted dogs arranged in opposite sides of the several sheaves, and having locking engagement with the portion of the cable encircling the sheaves, substantially as shown and described.

6. In an overhead-cable system of transportation, the combination with a series of stationary frames or supports, of a cable, a series of grooved sheaves held on said support and around which the cable is wound, dogs pivoted on opposite sides of the sheaves and adapted to engage with the cable-section encircling the sheaves and crossing on the upper side of the latter, and means arranged at the terminals of the line for stretching or slacking the cable adjacent to such terminals, substantially as shown and described.

7. In an overhead-cable system of transportation, the combination with a series of stationary frames or supports, of a cable, a series of grooved sheaves held on said support and around which the cable is wound, dogs pivoted on opposite sides of the sheaves and adapted to engage with the cable-section encircling the sheaves and crossing on the upper side of the latter, and means arranged on cable-supports intermediate of the terminals for slacking the cable, the latter being looped and engaged with such means at such points, as shown and described.

8. In an overhead-cable system of transportation, the combination with a series of stationary frames or supports of a cable, a series of grooved sheaves held on said support and around which the cable is wound, dogs pivoted on opposite sides of the sheaves and adapted to engage with the cable-section encircling the sheaves and crossing on the upper side of the latter, two windlasses applied to a cable-supporting frame, which is intermediate the terminals of the line, and antifriction cable-sheaves arranged between the said windlasses and the sheaves whereon the cable is wound, the cable having a loop between the windlasses sufficient to produce any required slack adjacent to the frame-support of the cable, substantially as shown and described.

9. In an overhead-cable system of transportation, the combination with a series of stationary frames or supports of a cable, a series of grooved sheaves held on said supports and around which the cable is wound, dogs pivoted on opposite sides of the sheaves and adapted to engage with the cable-section encircling the sheaves and crossing on the upper side of the latter, two windlasses applied to a cable-supporting frame which is intermediate the terminals of the line, means for locking said windlasses, a sheave 14 arranged adjacent to one of the cable-supporting sheaves 2 and antifriction-sheaves arranged on the frame below each of said cable-sheaves 2, the cable passing over the several sheaves and beneath the supporting-sheaves 2 and being secured to both windlasses and looped between the latter, as shown and described.

10. In an overhead-cable system of transportation, the combination with a stationary cable upon which carriages run, of a hauling-rope arranged adjacent thereto, guide-sheaves between which the rope runs, and a pivoted shiftable guard extending across the space intervening the pulleys, substantially as shown and described.

11. In an overhead-cable system of transportation, the combination of a stationary cable, a carriage adapted to travel on the latter and provided with a lateral and pendent arm, a hauling-rope attached to said arm, sheaves arranged opposite and serving as guides for said rope, a pivoted arm arranged horizontally, and a spring connected with the arm and tending to hold it extended across the space between the sheaves, the carriage-arm being adapted to pass between the upper edges of the sheaves and push the pivoted arm aside, as shown and described.

12. A rotatable cable support and lock, consisting of a grooved sheave, a casing in which the same is journaled and two weighted dogs pivoted in said casing one on each side of the sheaves and arranged with its weighted end in the same plane with the sheave, substantially as shown and described.

13. The improved carriage for use on overhead cables, comprising an arched and trussed top frame, and a straight frame joining the ends of the same, wheels which are journaled in the straight frame and alined with each other, substantially as shown and described.

14. The improved carriage for use on overhead cables, comprising an arched top frame, longitudinal bars connecting the ends of said frame, and struts connecting the bars with the arched top, substantially as shown and described.

15. The improved carriage for the use specified, comprising an arched top plate, an arched reinforcing plate or rib attached to the under side of the same, longitudinal bars connecting the ends of the arched portions, struts connecting the said bars with the arched top, and wheels journaled between the said bars in line with each other, substantially as shown and described.

16. The improved carriage for the use specified, comprising a frame provided with running wheels, and locking-bars pivoted on the depending portions of said frame and held normally projected inward so as to practically span the space beneath the wheels, whereby they are adapted to hold the carriage upon its support and to be pushed asunder for passing obstructions, substantially as shown and described.

17. The improved carriage for the purpose specified, comprising a frame having running wheels therein and depending portions as specified, obtuse-angled bars pivoted upon such depending portions and arranged horizontally, springs holding their angles normally in contiguity whereby they practically span the space beneath the wheels and are adapted to operate, substantially as shown and described.

18. The combination of the carriage with a fixed support upon which it is adapted to travel and locking-bars pivoted upon depending portions of the carriage and held normally in contiguity beneath the running wheels of said carriage and adapted to yield for passing obstructions in the line, substantially as shown and described.

19. The combination with a cable and support therefor consisting of sheaves and casings in which the same are journaled, said casings having lateral flanges at the top, of a carriage comprising a suitable frame and running wheels arranged therein, said carriage having depending portions and locking-bars pivoted thereto and projecting practically across the space beneath the wheels and adapted to yield as specified, whereby the carriage is locked to the cable and its supports, substantially as shown and described.

20. The improved carriage comprising a top and lower frame, running wheels journaled in the lower portion, a saddle attached to the latter and a C-shaped arm resting in said saddle and adapted for support of a grapple or other freight-carrier, substantially as shown and described.

21. The improved carriage for the purpose specified comprising an arched top portion, horizontal lengthwise bars connecting the end of the arch and saddle-piece interposed between the middle portion of said bars and supported thereon, and a C-shaped hanger attached to said saddle and bearing therein, and freight-carrying device attached to said hanger, substantially as shown and described.

22. The improved carriage for the purpose specified, comprising an overhead arch, lengthwise connecting-bars, running wheels journaled in the frame, a lateral arm having a depending V-shaped portion, the same being rigidly attached to the central portion of the carriage between the running wheels, substantially as shown and described.

TONY ALEXANDER.

Witnesses:
SOLON C. KEMON,
J. MIDDLETON.